UNITED STATES PATENT OFFICE.

LOUIS J. MONAHAN AND CHARLES J. POPE, OF OSHKOSH, WISCONSIN.

PROCESS OF MAKING SOY-MILK.

1,165,199.   Specification of Letters Patent.   Patented Dec. 21, 1915.

No Drawing.   Application filed April 10, 1913.   Serial No. 760,241.

*To all whom it may concern:*

Be it known that we, LOUIS J. MONAHAN and CHARLES J. POPE, citizens of the United States, residing at Oshkosh, in the county of Winnebago and State of Wisconsin, have invented certain new and useful Improvements in Processes of Making Soy-Milk, of which the following is a specification.

The invention relates to a new process of producing milk and its products from the vegetable known as soy bean, (*Soja hispada*,) the object being to provide an edible article to directly compete with cow's milk for human food with the advantages of the elimination of germ diseases due to the animal secretions and to produce an article free from elements harmful to diabetics.

It is well known that the soy bean contains rich food products of casein, albumin and fats analogous to mammal milk and by use of the herein described process a palatable and highly nourishing vegetable milk can be produced for practically all of the uses the animal milk is put to and principally for feeding infants who are subject to diseases transmitted by animal milk.

Our process consists of obtaining the ripe beans from the pods and finely pulverizing them either while they are green or after they are fully dried, the latter is preferable. After they are reduced to a powder the latter is rendered into an emulsion with fresh water or lime water and sodium bicarbonate, the reason for using these agents is to counteract the taste of the bean as much as possible as well as to partially arrest the oily odor therefrom, however the lime water alone is practically sufficient to accomplish the preliminary deodorizing operation but the sodium bicarbonate we find, adds considerable to effecting an improvement in the taste and assists in preventing immediate acid reaction therein.

It is desired to maintain an alkaline condition to prevent self coagulation of the casein, which would easily take place should the product become slightly acid, this is admirably accomplished by the lime water or soda added.

The emulsion is effected by adding the water or lime water very slowly while the powdered bean meal is being worked in suitable whipping or grinding apparatus until the oils and fats of the beans are thoroughly emulsified with the liquid after which more fresh water is added to reduce the consistency while the agitating of the mass continues. At this stage we practically have milk and the bean residue but the bean taste is still prominent. For giving a highly desirable sweet taste to the finished product we add about 8% of pecan or almond nut kernels during the emulsion process so that the sweet nut oils are thoroughly emulsified with the mass, the almond having a slight chemical reaction and leaving a modified sweet taste. However the nuts can be separately emulsified and added later if desired and any other sweet nut meats can be used. The emulsion is now filtered and the meal washed or "sparged" to extract the remaining milky liquid and the milk heated or cooked for several hours at a temperature below the coagulation point of the albumin to drive off the remaining offensive oily tastes and odors and to render it more digestible, however the whole mass may be cooked and filtered afterward, with the result that a little more product will be derived from the beans.

During the cooking process, the liquid is continually agitated to completely heat the mass and when completed a scum accumulates on the surface which consists of vegetable oils and which is removed after the cooking. When the cooking is completed and the milk again filtered it is ready for bottling for use, after it is given a final flavor with sodium chlorid and a small amount of permissible food flavor to suit the taste, however we do not recommend anything further than the sodium chlorid and sufficient cooking to remove the non-palatable oils and odor.

Filtering the finished product through bone black has a tendency to lighten its color and assist in clearing the slight oily odor and this step can be added as a refinement in the process if desired but is already in use in the arts and will not be claimed here.

As a further agent for counteracting the color and taste we find cocoanut oil a valuable agent, especially for imparting a light color to the product which in most instances should prove more satisfactory than filtering through the charcoal.

For other preparations for dispensing use, chocolate and sugar is mixed with the milk to produce an agreeable drink but when the milk is consumed by diabetics the sugar or chocolate preparation must be dispensed with.

The essential features of the process are the emulsifying and cooking of the emulsion, the addition of the other constituents being to change the taste of the product either by covering same with more favorable tastes or to set up a slight acid reaction as in the case with the almonds.

The lime water used to start the emulsion is a desirable step in the operation because of the immediate change of taste produced thereby.

Harmless ingredients are used throughout the process.

We claim:

1. The process of making soy milk which consists in extracting the casein and vegetable oil from soy beans by emulsifying them with water in the presence of an alkali, separating the emulsified liquid and heating it for an extended period.

2. The process of producing soy milk which consists in grinding soy beans to a coarse powder, adding a small portion of cocoanut oil to the powder, emulsifying the powder with water, filtering off the liquid from the residue and cooking the filtrate for several hours below the boiling point of water.

3. The process of producing soy milk which consists of grinding soy beans to a coarse powder, extracting the milk constituents therefrom by emulsifying the powder with approximately an equal amount of water at a temperature above 80 Fahr., adding more water to the emulsion to thin, filtering out the liquid from the residue, washing the residue to win all of the remaining milk products and cooking the liquid.

4. The process of producing milk consisting of pulverizing soy beans, mixing the powder with sodium bicarbonate and emulsifying the powder with water, cooking the emulsion and filtering out the residue.

5. The process of making milk which consists in pulverizing soy beans, adding sodium bicarbonate, emulsifying the powder with lime water, cooking the emulsion and filtering out the residue.

6. The process of making milk which consists in pulverizing soy beans, emulsifying and grinding nut kernels in with the powder, mixing the powder with water, filtering out the residue and cooking the emulsified liquid.

7. The process of making milk which consists in pulverizing soy beans, mechanically emulsifying the powder with lime water, adding nut kernels while emulsifying, cooking the emulsion and filtering out the residue.

8. The process of making milk which consists in pulverizing soy beans, adding water during the pulverizing process to start emulsive action, regrinding the product and adding water, agitating the mass while further adding water to thin, cooking the product and filtering out the residue.

9. The process of making milk which consists in pulverizing soy beans, emulsifying the powder with lime water, cooking the emulsion, filtering out the residue and adding chocolate and sugar.

10. The process of making soy milk which consists of producing an emulsion with water by working the beans with the water under rubbing and pressing action until practically all of the milky oils and fats are thoroughly emulsified with the water, straining off the liquid and adding more water to the beans, further agitating the mass to recover approximately all of the milky constituents therefrom and cooking or boiling the recovered liquid for an extended period.

11. The process of making soy milk which consists in grinding soy beans, adding nut oil and water to the ground beans and making an emulsion thereof, recovering the liquid milk from the mass, heating the liquid and finally filtering out all sediment and coagulated matter.

12. A new liquid food product consisting of a cooked or boiled emulsion of soy bean extract, nut oil and water.

In testimony whereof we affix our signatures, in the presence of two witnesses.

LOUIS J. MONAHAN.
CHARLES J. POPE.

Witnesses:
A. F. DUKERSCHEIN,
F. V. McMANAMY.